United States Patent [19]

Dust

[11] 4,324,355
[45] Apr. 13, 1982

[54] MECHANISM FOR RETRACTING THE PRESSURE ROLLERS OF A TAPE TRANSPORT WHEN THE POWER IS OFF

[75] Inventor: James A. Dust, Minnetonka, Minn.

[73] Assignee: Telex Communications, Inc., Minneapolis, Minn.

[21] Appl. No.: 132,383

[22] Filed: Mar. 21, 1980

[51] Int. Cl.³ .......................................... B65H 17/20
[52] U.S. Cl. ..................................... 226/190; 242/208
[58] Field of Search .............. 226/176, 181, 190, 196; 242/199–204, 206, 208, 209, 210

[56] References Cited

U.S. PATENT DOCUMENTS 3,137,429  6/1964  Joslow ................................ 226/176
3,257,056  6/1966  Cederberg et al. ................. 226/176
3,637,165  1/1972  Rethwish ............................ 242/199
3,643,846  2/1972  Kato et al. .......................... 226/181

Primary Examiner—Leonard D. Christian
Attorney, Agent, or Firm—Peterson, Palmatier, Sturm & Sjoquist, Ltd.

[57] ABSTRACT

A tape transport has two pinch rollers, either of which presses the tape against the capstan with which that pinch roller coacts in order to advance the tape in the desired direction. When power is off, neither pinch roller should press against its capstan. A retraction mechanism includes a spring acting in a direction to withdraw or retract whichever pinch roller would otherwise bear against its capstan when the power is off. However, when the power is on, the mechanism permits the pinch rollers to function in their usual manner.

4 Claims, 6 Drawing Figures

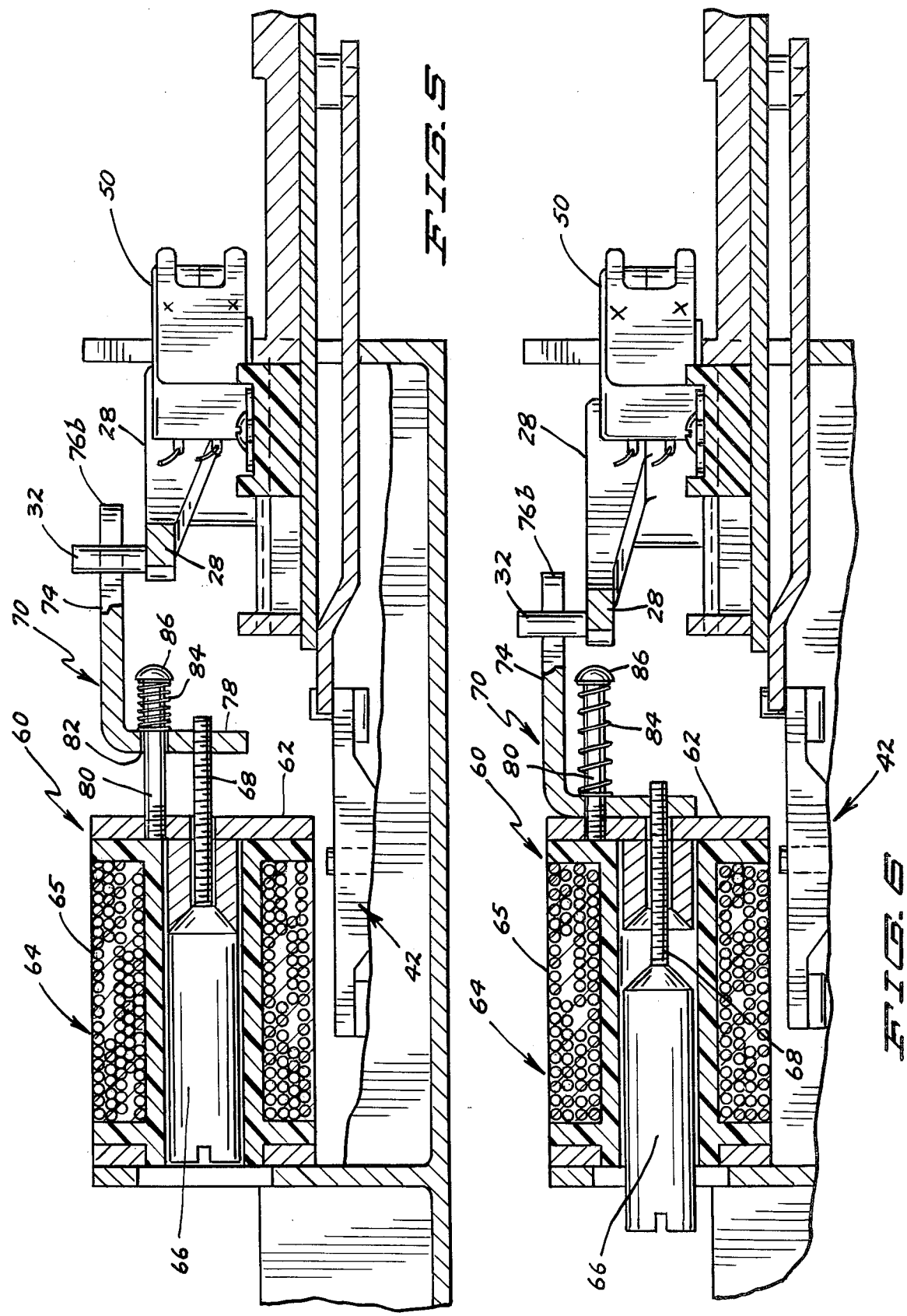

MECHANISM FOR RETRACTING THE PRESSURE ROLLERS OF A TAPE TRANSPORT WHEN THE POWER IS OFF

BACKGROUND OF THE INVENTION

This invention relates generally to tape transports and pertains more particularly to a mechanism for retracting the pressure or pinch rollers with respect to their capstans when the power is off.

If either pinch roller remains in engagement with its capstan when the transport is not being used, the roller, being of elastomeric material, becomes deformed or out of round, thereby developing "flat" spots that interfere with the steady or uniform drive of the tape relative to the tape head of the transport. Furthermore, if the tape cassette is left in the transport with either pinch roller, the pressure of the roller against the tape causes the plastic or film side of the tape to cling to the capstan with the consequence that the tape is prone to wrap around the capstan during either the next play or fast rewind mode.

SUMMARY OF THE INVENTION

Therefore, an object of the present invention is to retract automatically the pinch rollers when power is removed from the transport. In this regard, one pinch roller is normally retracted during a play mode, thereby enabling the other pinch roller, under the influence of its biasing spring, to produce tape movement in the appropriate direction. It is an aim of the invention, however, to cause retraction of whichever of the two pinch rollers is bearing against its capstan so that both are retracted during an idle or non-use period. In this way, objectionable deformation of the rollers is obviated and the chance of the tape wrapping around the capstan is greatly reduced.

Another object is to permit the normal biasing of the appropriate pinch roller without interference when power is being supplied to the tape transport. In this way, whichever pinch roller is to press the tape against the capstan with which it coacts is instrumental in advancing the tape past the tape head in the same manner as heretofore.

As far as cassette tape transports are concerned, it is important to have the components as miniaturized as practical. Therefore, an object of the invention is to provide a retraction mechanism that is quite compact, yet exceedingly effective in achieving its goal.

Yet another object of the invention is to provide a retraction mechanism of the foregoing character that is simple and rugged so that it requires virtually no maintenance.

Still further, an object of the invention is to provide a retraction mechanism that is relatively inexpensive, thereby encouraging its incorporation into tape players of various types, although it has especial utility in tape transports of the cassette variety.

Briefly, our invention includes a solenoid having a protractable armature or plunger. When the solenoid is energized, as it is when power is being supplied to the tape transport, then the plunger is projected or protracted in a direction to cause a pulling member to move into a position in which it does not exert any retractive effort as far as the pinch rollers are concerned. Stated somewhat differently, when the solenoid is energized, each carrier arm, which is independently spring biased, can move in a direction to cause its pinch roller to coact with the particular capstan that is to furnish the driving action for the tape. It will be appreciated that one or the other of the pinch rollers is effectual to produce a tape drive during a playing mode. It is within the purview of our invention to permit the pinch rollers to function in their usual way when power is supplied to the transport, yet be retracted whenever power is removed in order to avoid pinch roller deformation and undesirable tape entanglement with either capstan.

BRIEF DESCRIPTION OF THE DRAWINGS

FIGS. 5 and 6 are enlarged sectional views taken in the direction of line 5—5 of FIG. 3 and line 6—6 of FIG. 4, respectively.

DESCRIPTION OF THE PREFERRED EMBODIMENT

Figure 1:
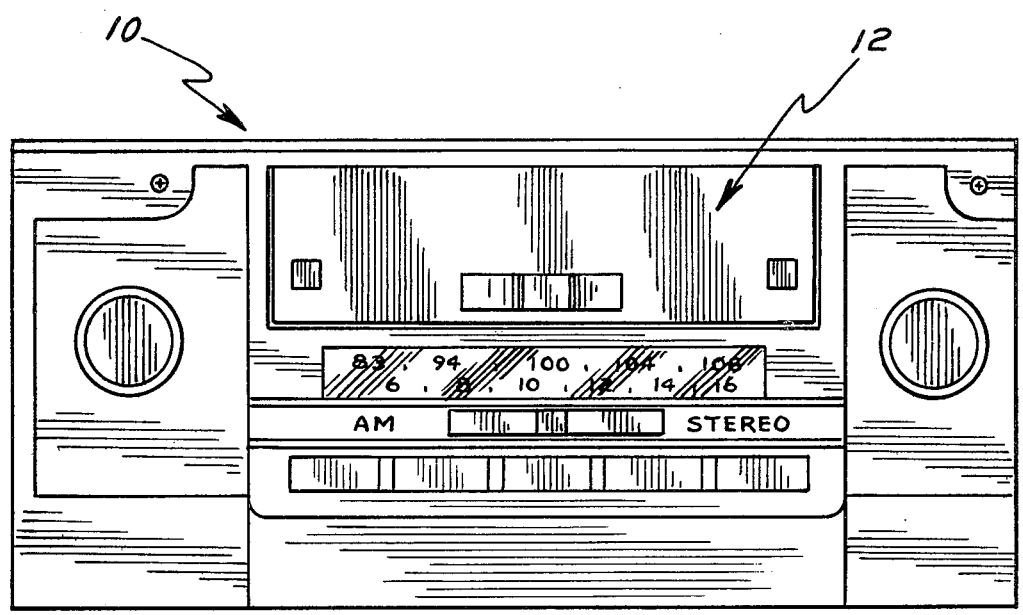
FIG. 1 is a front elevational view depicting a cassette tape transport installed in an automobile radio.
Figure 2:
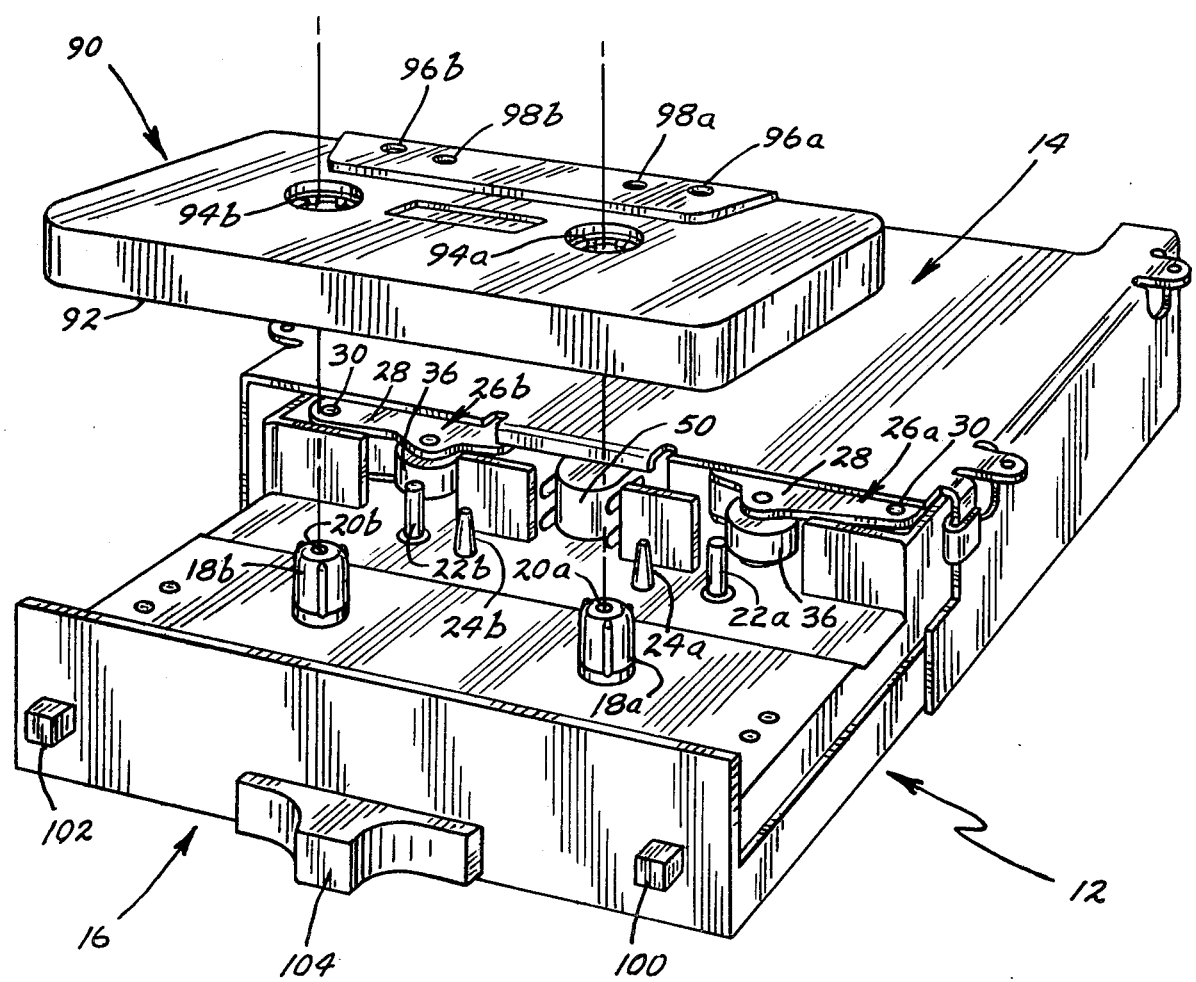
FIG. 2 is a perspective view showing the casing and the drawer constituting the tape transport, the drawer being open in order to expose to view certain of the operational components.

Referring first to FIG. 1, an automobile radio 10 has been shown and which contains tape transport apparatus 12 constructed in accordance with our invention. From FIG. 2, it can be discerned that the apparatus 12 includes a casing 14 and a slidable drawer 16, the drawer 16 being open in FIG. 2 and closed in FIG. 1. Inasmuch as some of the operational parts or components intimately associated with our invention are concealed by the casing in FIG. 2, it can be pointed out that in FIGS. 3 and 4 the casing has been omitted.

In order to provide an adequate background for understanding our invention, it is to be noted that the drawer 16 has mounted thereon first and second take-up spindles 18a and 18b, the take-up spindle 18a having a shaft 20a extending downwardly through the drawer 16 and the spindle 18b having a similar shaft 20b extending downwardly. A pair of capstans 22a and 22b are employed. Still further, it will be noted that a pair of registering pins 24a and 24b extend upwardly from the drawer 16.

Attention is now directed to a pair of pressure or pinch roller carriers indicated indicated generally by the reference numerals 26a and 26b. Each carrier 26a and 26b includes an arm 28 that is pivotally mounted at one end to the drawer 16 by means of a pin 30. An upstanding pin 32 is mounted at the other or free end of the arm 28. A pin 34 is disposed intermediate the ends of the arm 28 of each carrier 26a, 26b which rotatably supports a pressure or pinch roller 36. As is conventional, the pinch rollers 36 coact with the previously mentioned capstans 22a and 22b. More specifically, each arm 28 is biased in a direction to urge its particular pinch roller 36 toward the capstan 22a or 22b with which it coacts, there being a torsion spring 38 which performs this biasing action.

For the sake of completeness, it is to be noted that each arm 28 has a downwardly extending pin 40 which is acted upon by what will be called a direction of play mechanism 42. Since the direction of play mechanism 42 is fully described and claimed in copending application Ser. No. 134,443, filed Mar. 27, 1980 in the names of Gordon R. Schmidt and Keith O. Erickson for CASSETTE TAPE TRANSPORT APPARATUS, it is not believed necessary to describe the mechanism 42 in any detail herein. The alluded to application is assigned to the same assignee and reference thereto can be made if necessary. All that really should be appreciated at this time is that the mechanism 42 is bistable in its operation, causing a transmission plate 44, which is a part of the mechanism 42, to be shifted laterally in either direction. A solenoid 46 causes the plate 44 to be shifted in alternate directions each time it is electrically energized.

Movement of the plate 44 in one lateral direction will act on the pin 40 of the carrier 26a to retract the arm 28 of the carrier 26a so that its pinch roller 36 is withdrawn from the capstan 22a with which it coacts. This is the condition appearing in FIG. 3. It will be observed that the arm 28 of the carrier 26b is not retracted at this time, so that its pinch roller 36 bears against the tape, which has been denoted by the numeral 48, forcing it against the other capstan 22b to cause movement of the tape 48 past the tape head labeled 50.

Since certain cam edges on the plate 44 are clearly shown and described in said copending application identified hereinbefore, further description of the playing operation is not believed essential. It will be appreciated, though, that when the plate 44 is shifted in an opposite lateral direction from that mentioned in the preceding paragraph, then the pin 40 of the carrier 26b is acted upon to retract the pinch roller 36 of the carrier 26b. The shifting of the plate 44 is accomplished by means of the solenoid labeled 46, as already explained.

Another electrically operated component that should be referred to is an electric motor 52. A flywheel system (not herein shown, but shown in said copending application) is driven by the motor 52 and serves to rotate the capstans 22a, 22b as well as the shafts 20a, 20b of the take-up spindles 18a and 18b.

Figure 3:
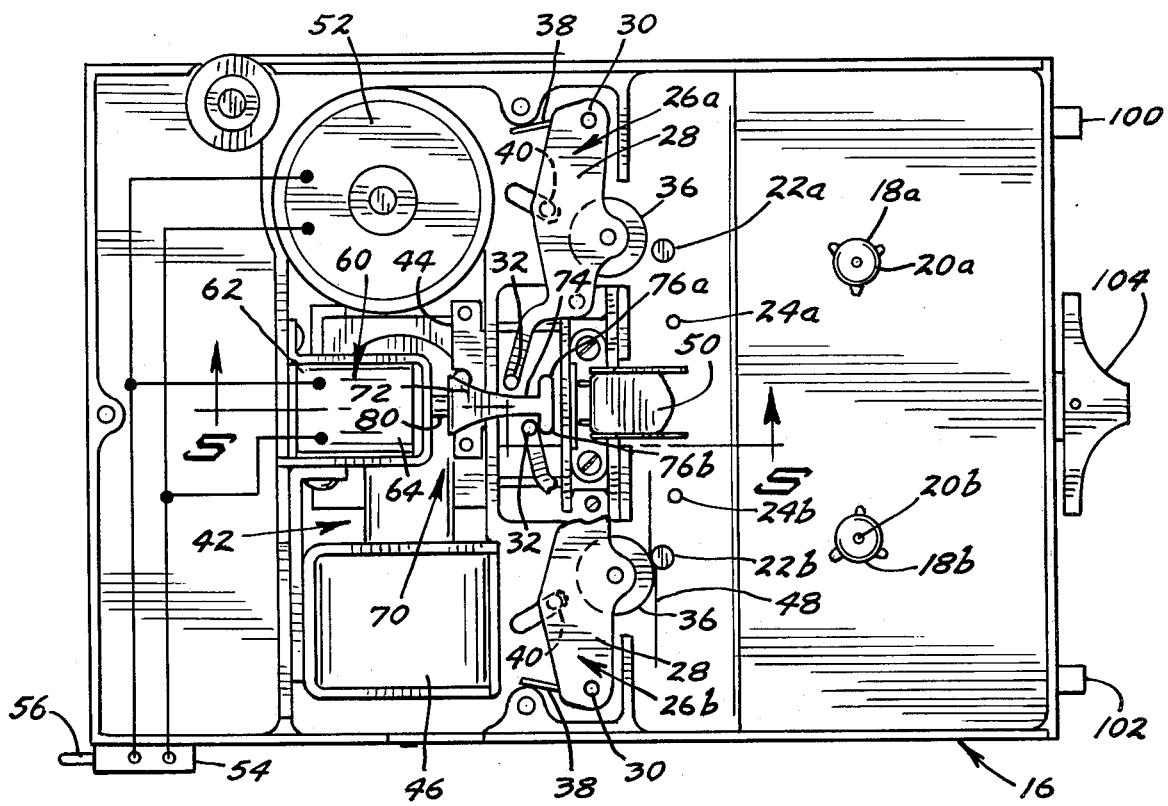
FIGS. 3 and 4 are top plan views of the drawer depicting the preferred embodiment of our invention, FIG. 3 showing our mechanism when the solenoid is energized and FIG. 4 showing our mechanism when the solenoid is de-energized.
Figure 4:
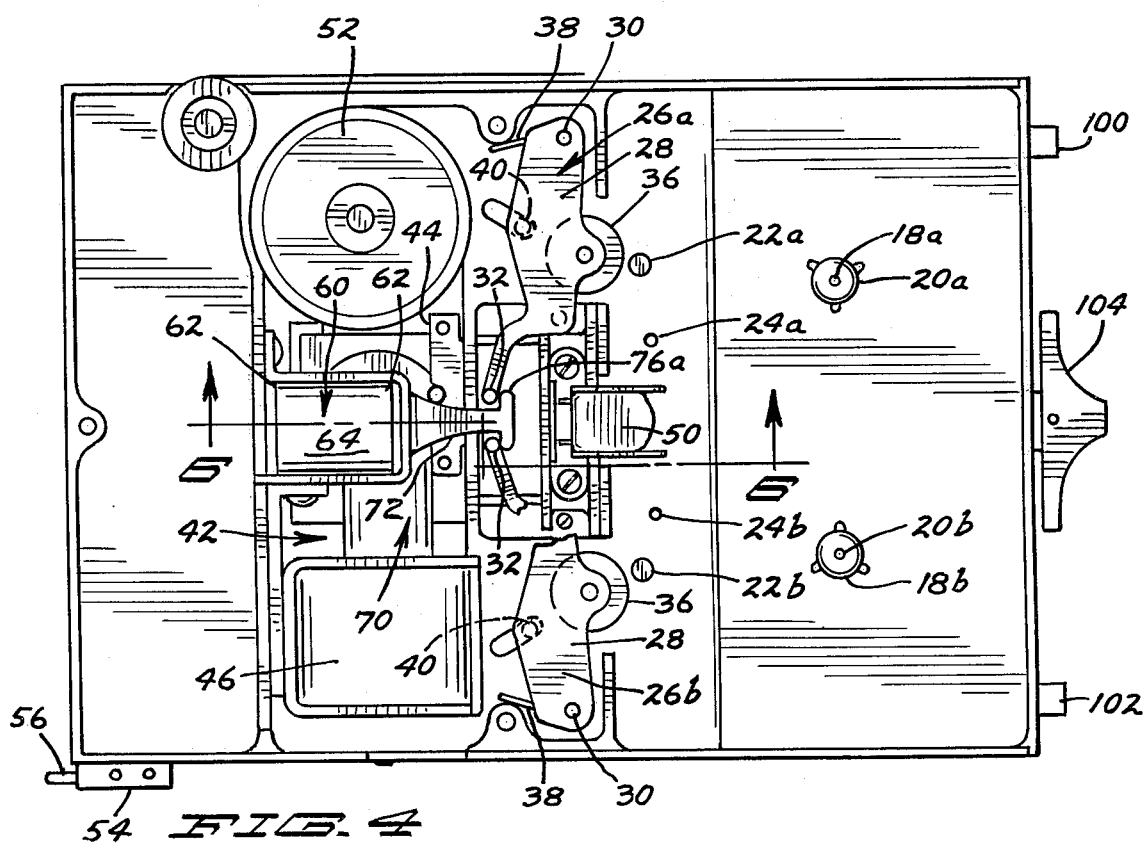

It might also be well at this stage of the description to refer to a microswitch 54 having a plunger 56 that is forced to the right in FIGS. 3 and 4 when the drawer 16 is fully closed, the plunger 56 striking a stop at the rear of the casing 14. In this regard, the plunger 56 is forced in a direction to close the otherwise open contacts included in the switch 54 and thereby complete an electrical circuit to the solenoid 46 and also to the motor 52. It is not believed necessary to show the electrical connection of the microswitch 54 to the power supply. All that really requires understanding is that the power is derived from the battery of the automobile via the automobile's radio 10. Because the specific circuit is unimportant to an understanding of the invention, it has been shown very diagrammatically in FIG. 3; while whatever circuit is adopted would, of course, be present in FIG. 4, the circuit of FIG. 3, being only general, has not been depicted in FIG. 4.

Owing to the bistable character of the direction of play mechanism 42, it can be seen that whenever power is removed, which it is when the microswitch 54 is open, then the pinch roller 36 belonging to the carrier 26b, this being the condition depicted in FIG. 3, would remain in engagement with its capstan 22b. The torsion spring 38 of the carrier 26b, this spring normally biasing the pinch roller 36 of the carrier 26b in the direction of the capstan 22b, would continue to supply or furnish its biasing action with the consequence that any prolonged period of idleness would be likely to cause the roller 36 in this case to become deformed, more specifically to cause a flat to be formed thereon. The same thing holds true for the pinch roller 36 belonging to the carrier 26a, for if it is acting against the capstan 22a to move the tape 48 in an opposite direction, then it would remain against the capstan 22a. Static or non-rotating pressure of either roller 36 against the oxide or coated side of the tape 48 forces the film or uncoated side of the tape against either the capstan 22a or 22b, as the case may be, causing the tape to stick or cling to the capstan with the consequence that the tape is apt to wind itself around the capstan during the next playing or rewinding mode.

By way of an example, a retraction mechanism denoted generally by the reference numeral 60 has been illustrated which pulls either of the pinch rollers 36 away from the capstans 22a and 22b with which they cooperate. In this regard, the mechanism 60 includes a U-shaped bracket 62 which is fixedly mounted with respect to the drawer 16. The purpose of the bracket 62 is to hold in place a solenoid 64 having a winding 65 and a reciprocal armature or plunger 66. From FIGS. 5 and 6, it can be seen that the forward end of the plunger 66 has a threaded end portion 68 projecting axially therefrom and hence movable whenever the armature or plunger 66 is moved.

Of importance as far as practicing our invention is concerned is what will generally be termed a T-shaped bar 70. The T-shaped configuration can be seen in FIGS. 3 and 4. More specifically, the T-bar 70 includes a forwardly converging shank 72 having a narrow neck at 74. Issuing laterally from the neck 74 are ears 76a and 76b. It is these ears 76a, 76b that are engageable with the upstanding pins 32 on the carriers 26a and 26b.

Whereas the member 70 has a T-shaped appearance when viewed from above, as in FIGS. 3 and 4, it has an L-shaped appearance when viewed from the side, as in FIGS. 5 and 6. In this regard, it is to be noted that the bar or member 70 has a downturned flange 78. The lower portion of the flange 78 is tapped for the threaded reception of the threaded end portion 68. However, in order to maintain the shank 72 horizontal, a guide rod 80 extends from the bracket 62, the flange 78 having a hole 82 formed therein so that the bar 70 can slidably move therealong by reason of the hole 82. In other words, the pin keeps the flange 78, and hence the bar 70, from rotating about the axis of the plunger 66 and the forwardly extending threaded member 68 carried thereon.

The guide rod or pin 80 serves another purpose in that it has a coiled compression spring 84 disposed thereon. The forward end of the guide rod or pin 80 has an enlarged head 86 integral with the free end thereof so as to hold the right end of the spring 84 captive, the left end of the spring 84 bearing against the vertical flange 78 of the bar 70.

It can be pointed out that the solenoid 64 is of the so-called pusher type. In other words, when the winding 65 of the solenoid 64 is energized, the armature or plunger 66 is protracted or propelled outwardly toward the right as viewed in FIG. 5, the flange 78 compresses the coil spring 84. However, when the solenoid 64 is de-energized, as it is when the microswitch 54 is open, then the spring 84, which is compressed when the plunger 66 is protracted, expands to the condition depicted in FIG. 6. The vertical flange 78, of course, compresses the spring 84 against the head 86 when the solenoid 64 is energized since the T-bar 70 is mounted on the plunger 66 by reason of the threaded engagement of the flange 78 with the plunger end 68.

Consequently, when the solenoid 64 is de-energized, the T-bar 70 is urged to the left as viewed in FIGS. 4 and 6 with the result that the ears 76a, 76b act against whichever pin 32 is forward, pulling that pin 32 rearwardly or to the left as viewed in these figures. Whichever pinch roller 36 belonging to the carrier 26a or 26b, as the case may be, will also be pulled rearwardly in the performance of the retractive action. Owing to this, the biasing action supplied by the torsion springs 38 is overcome by the rearward pull exerted by the ears 76a and 76b. Of course, it has already been explained that only one or the other of the pinch rollers 36 will be biased in the direction of its capstan 22a or 22b, this being due to the way in which the direction of play mechanism 42 functions.

From the foregoing, it will be evident that whenever the power is off, our retraction mechanism 60 immediately functions to withdraw either of the pinch rollers 36 by reason of the expansion of the coil spring 84 which spring is compressed when the solenoid 64 is energized. The strength of the spring 84, it will be recognized, is sufficiently great to overcome the biasing action of either of the torsion springs 38. Additionally, there is a mechanical advantage to be gained by reason of the length of each arm 28 as measured between its pivot pin 30 and its upstanding pin 32. In other words, it is the strength of the spring 84 and the mechanical advantage derived from the length of the arms 28 that is important, for it is necessary in the carrying out of the invention that the combined advantage be enough so as to withdraw the pinch rollers 36.

Whenever the power is turned on, though, then the solenoid 64 of the mechanism 60 is energized so as to protract its armature plunger 66. Inasmuch as the threaded end 68 is an integral part of the plunger 66 and the vertical flange 78 of the T-bar 70 is mounted directly on the threaded end 68, it follows that the T-bar 70 is urged outwardly or to the right as viewed in FIGS. 3–6 so that the two upstanding pins 32 on the carriers 26a and 26b are under these circumstances free to move without restraint that is, uninfluenced by the retraction mechanism 60. In this way, the direction of play mechanism 42 can operate in its normal manner without any adverse interference from the retraction mechanism 60.

From the foregoing, it should be evident that the invention is capable of use with any type of transport. Nonetheless, the invention possesses particular utility when used in conjunction with the cassette tape transport 12 that has been described herein. Therefore, attention is drawn to the conventional tape cassette 90 appearing in FIG. 2 and which is about to be lowered. Since the tape cassette 90 is typical of a number of such cassettes commercially available, it need only be explained that the cassette 90 includes a plastic housing 92 having openings 94a and 94b for the accommodation of the spindles 18a and 18b, respectively, the spindles 18a, 18b in this way engaging the hubs of reels (not visible) within the housing 92 on which the tape 48 is wound and rewound. The housing 92 is also conventionally formed with holes 96a, 96b and 98a, 98b for receiving the spindles 22a, 22b and registering pins 24a, 24b, respectively, when the cassette 90 is lowered onto the drawer 16 in preparation for playing the tape contained therein.

The point to be emphasized is that when a cassette tape transport, such as the exemplary transport 12, is equipped with the retraction mechanism 60 described herein, there is no need to remove the cassette 90 between playing operations, for the automatic retraction of the pressure or pinch rollers 36 assures that no pressure is applied to the tape even though it remains between the two capstans 22a, 22b and the two rollers 36 in immediate readiness for play or resumed play. Experience, as earlier herein pointed out, has demonstrated that a clinging or sticking action develops from the roller pressure if the rollers 36 are allowed to pressurally engage the tape, such as the tape 48. For all intents and purposes, the present invention avoids this by retracting the rollers 36 through the agency of the mechanism 60.

Although unimportant to an understanding of the instant invention, it can be noted that the reversing mechanism 42 can be manually activated by means of a pushbutton 100. Also, there is another pushbutton 102 for unlatching the drawer 16 so that it moves by spring action from its closed position in FIG. 1 to its open position in FIG. 2. Still further, a handle or knob 104 operates a fast wind and rewind mechanism. These features are fully described in the copending patent application that has been earlier herein identified.

What is claimed:

1. In a tape transport including a pair of capstans, a pair of carrier arms pivotally mounted adjacent one end thereof and each having a pinch roller intermediate said one end and the other end thereof, said pinch rollers being cooperable with said capstans, and respective means independently biasing each carrier arm in a direction so as to cause the pinch roller mounted thereon to move in the direction of the capstan with which it is cooperable, a pinch roller retraction mechanism comprising an upstanding pin at the other end of each of said carrier arms, a T-shaped bar having laterally issuing ears at one end thereof engagable with said upstanding pins when said T-shaped bar is moved in one direction, spring means for moving said T-shaped bar in said one direction, and solenoid means for moving said T-shaped bar in an opposite direction so as to disengage said ears from said upstanding pins whereby either one of said pressure rollers is biased in the direction of the capstan with which it is cooperable.

2. The combination of claim 1 in which said T-shaped bar resides in a generally horizontal plane, said bar having a vertical flange at the end thereof opposite from said ears, said solenoid means including a reciprocal plunger having a threaded end portion extending therefrom and movable in unison therewith, said threaded end portion engaging said vertical flange so as to cause said T-shaped bar to also move in unison with said plunger, a fixedly disposed guide rod, said vertical flange having a hole therein through which said guide rod projects, a coil spring carried on said guide rod, and means mounted at the free end of said guide rod so that said spring is compressed when said plunger is protracted by the energization of said solenoid means.

3. The combination of claim 2 in which said last-mentioned means constitutes an enlarged head integral with the free end of said guide rod.

4. In a tape transport including a capstan, an arm pivotally mounted at one end, a pinch roller cooperable with said capstan and mounted for rotation on said arm at a location between said one end and the other end thereof and first means biasing said arm and said pinch roller in the direction of said capstan, a pinch roller retraction mechanism comprising second means including a coil spring for overcoming the action of said first means to retract said pinch roller from said capstan, a pin means extending outwardly from said other end of said arm, and electromagnetic means having a solenoid having a plunger including third means in the form of a bar connected at one end to said plunger for movement in unison therewith and having a laterally extending ear at its other end for engaging said pin, for rendering said second means ineffectual when said electromagnetic means is energized whereby said second means is effectual to retract said pinch rollers when said electromagnetic means is de-energized.

* * * * *

UNITED STATES PATENT AND TRADEMARK OFFICE
CERTIFICATE OF CORRECTION

PATENT NO. : 4,324,355

DATED : April 13, 1982

INVENTOR(S) : James A. Dust

It is certified that error appears in the above-identified patent and that said Letters Patent are hereby corrected as shown below:

In the title, delete "WHEN THE POWER IS OFF"

Signed and Sealed this

Twenty-second Day of June 1982

[SEAL]

Attest:

GERALD J. MOSSINGHOFF

Attesting Officer     Commissioner of Patents and Trademarks